(12) United States Patent
Zaatarah

(10) Patent No.: US 11,270,391 B2
(45) Date of Patent: Mar. 8, 2022

(54) METHOD AND SYSTEM FOR REPORTER ENTITY DELIVERY

(71) Applicant: 360MEA Ltd, Tortola (VG)

(72) Inventor: Khaled Zaatarah, Dubai (AE)

(73) Assignee: 360MEA Ltd

( * ) Notice: Subject to any disclaimer, the term of this patent is extended or adjusted under 35 U.S.C. 154(b) by 0 days.

(21) Appl. No.: 16/233,120

(22) Filed: Dec. 27, 2018

(65) Prior Publication Data
US 2019/0304035 A1     Oct. 3, 2019

Related U.S. Application Data

(60) Provisional application No. 62/648,869, filed on Mar. 27, 2018.

(51) Int. Cl.
| | | |
|---|---|---|
| *G06Q 50/00* | (2012.01) | |
| *H04W 4/02* | (2018.01) | |
| *H04N 21/00* | (2011.01) | |

(52) U.S. Cl.
CPC ............. *G06Q 50/01* (2013.01); *H04N 21/00* (2013.01); *H04W 4/023* (2013.01)

(58) Field of Classification Search
None
See application file for complete search history.

(56) References Cited

U.S. PATENT DOCUMENTS

| | | | | |
|---|---|---|---|---|
| 7,720,353 B1 * | 5/2010 | Jouppi | ................... | H04N 5/783 386/241 |
| 2005/0168568 A1 * | 8/2005 | Jouppi | ................. | H04N 5/2259 348/36 |
| 2009/0148124 A1 * | 6/2009 | Athsani | .................. | H04N 21/84 386/241 |
| 2009/0210271 A1 * | 8/2009 | Abrams | ................. | G06Q 10/10 709/205 |
| 2011/0157231 A1 * | 6/2011 | Ye | ......................... | G06F 3/0346 345/649 |
| 2014/0089067 A1 | 3/2014 | Filev et al. | | |
| 2014/0274307 A1 | 9/2014 | Gonzalez | | |
| 2015/0077502 A1 * | 3/2015 | Jordan | .................... | H04N 7/142 348/14.03 |
| 2015/0281744 A1 * | 10/2015 | Chapman | ......... | H04N 21/21805 725/37 |
| 2018/0146217 A1 * | 5/2018 | Kedenburg, III | .. | H04N 21/2187 |
| 2018/0160153 A1 * | 6/2018 | Rajewski | ........... | H04N 21/2187 |

OTHER PUBLICATIONS

International Search Report and Written Opinion received in PCT/IB2019/052504 ISR/WO, dated Jun. 27, 2019 (10 pages).

* cited by examiner

*Primary Examiner* — Andrew B Whitaker
(74) *Attorney, Agent, or Firm* — Cooley LLP

(57) ABSTRACT

Embodiments of a method and/or system can (e.g., for causing reporting of a happening; etc.) can include determining a happening parameter (e.g., a happening parameter indicative of a characteristic of the happening; etc.); presenting the happening parameter to a user; receiving a user input from the user; delivering, for capture of the happening (e.g., during a time period associated with occurrence of the happening, etc.), a reporter entity to a happening location associated with the happening (e.g., based on the user input; etc.); and/or presenting a media component, generated based on the capture of the happening, to the user S150.

22 Claims, 11 Drawing Sheets

METHOD AND SYSTEM FOR REPORTER ENTITY DELIVERY

CROSS-REFERENCE TO RELATED APPLICATIONS

This application claims the benefit of U.S. Provisional Application Ser. No. 62/648,869, filed on 27, Mar. 2018, which is incorporated herein in its entirety by this reference.

TECHNICAL FIELD

This technology relates generally to the field media content provision, and more specifically to a new and useful method and system for reporter entity delivery.

DESCRIPTION OF THE EMBODIMENTS

The following description of the embodiments is not intended to limit the embodiments, but rather to enable any person skilled in the art to make and use.

1. Overview

Figure 1A:
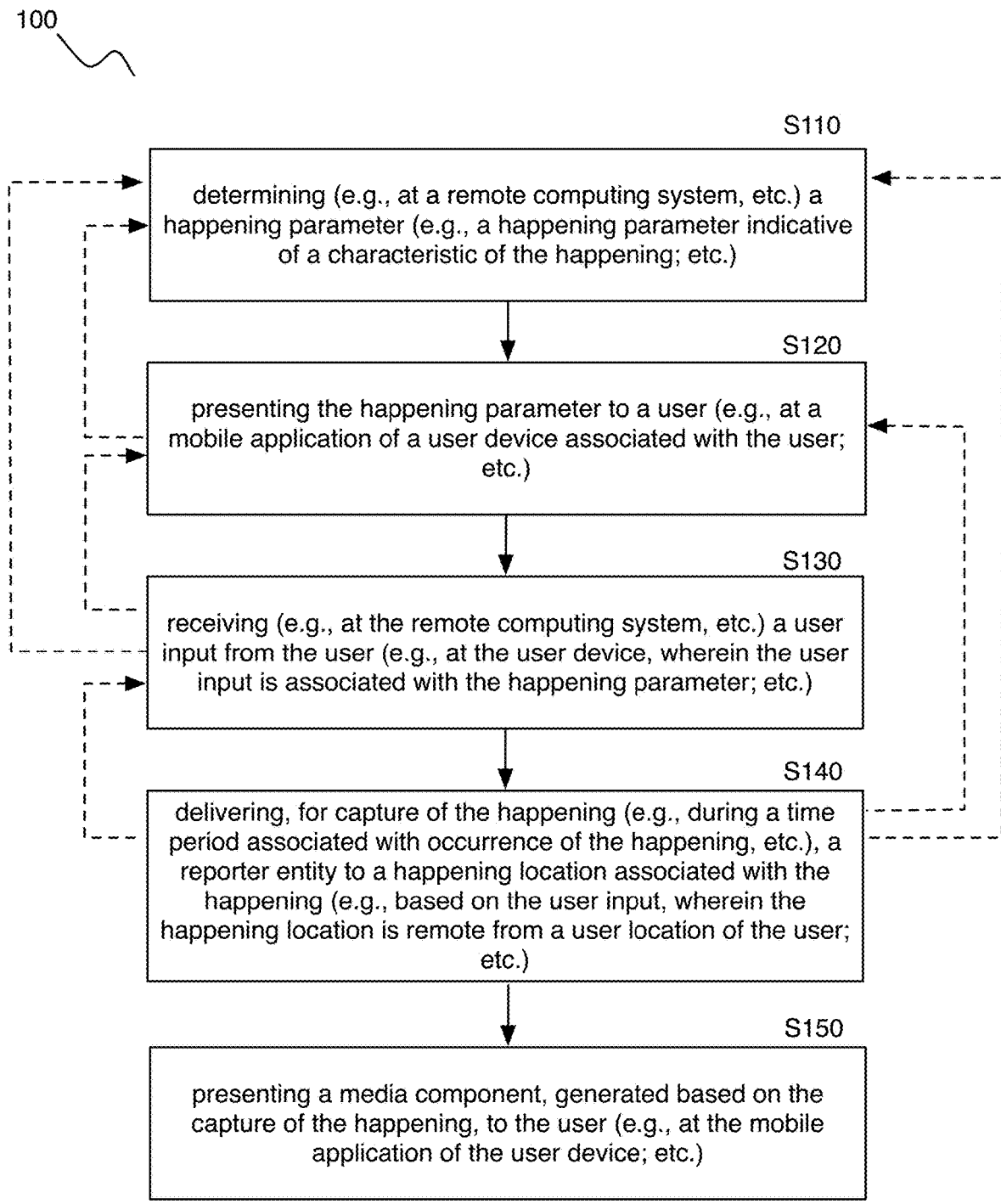
FIG. 1A-1B include flowchart representations of variations of an embodiment of a method for delivering one or more reporter entities.
Figure 1B:
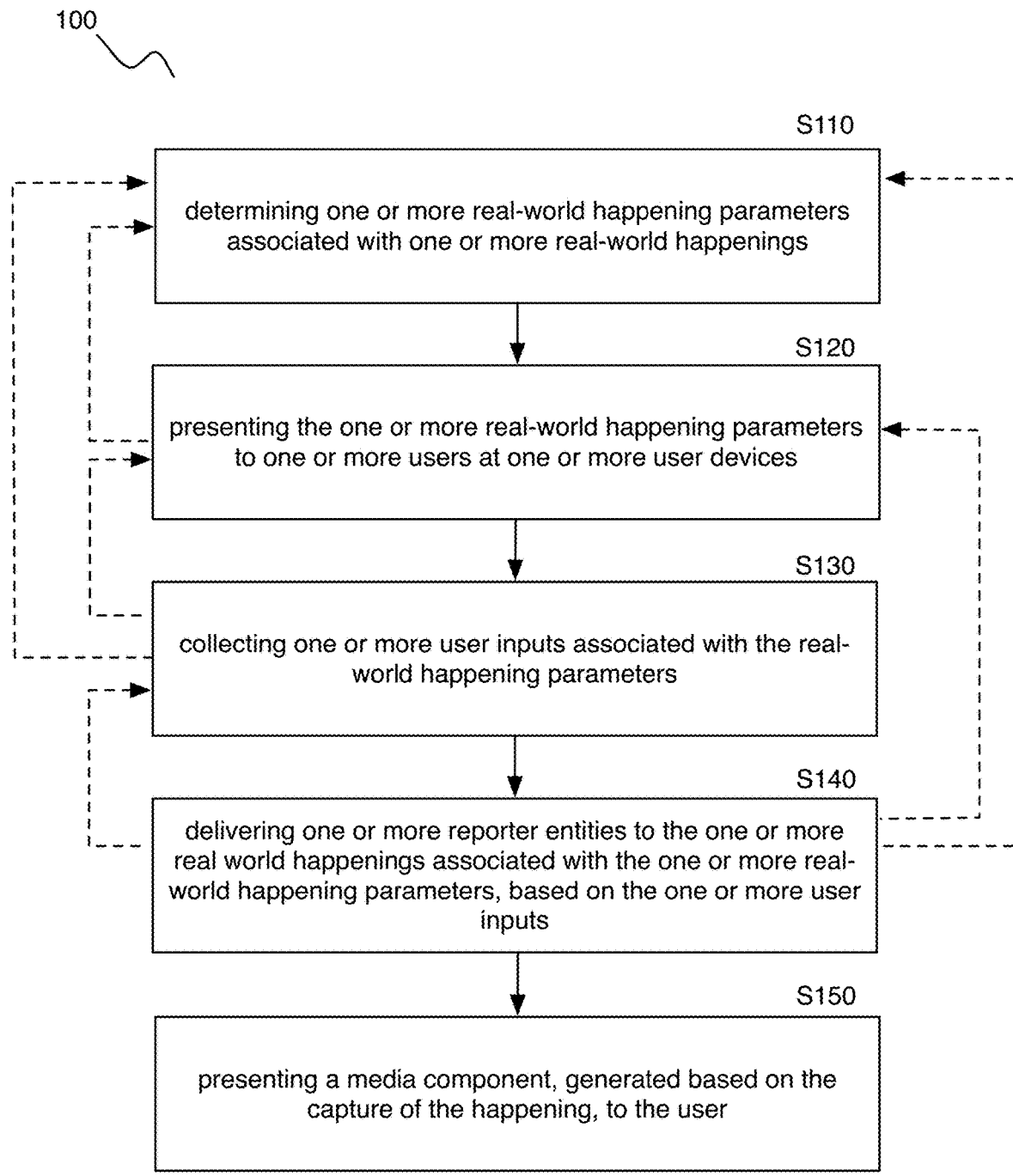
Figure 2:
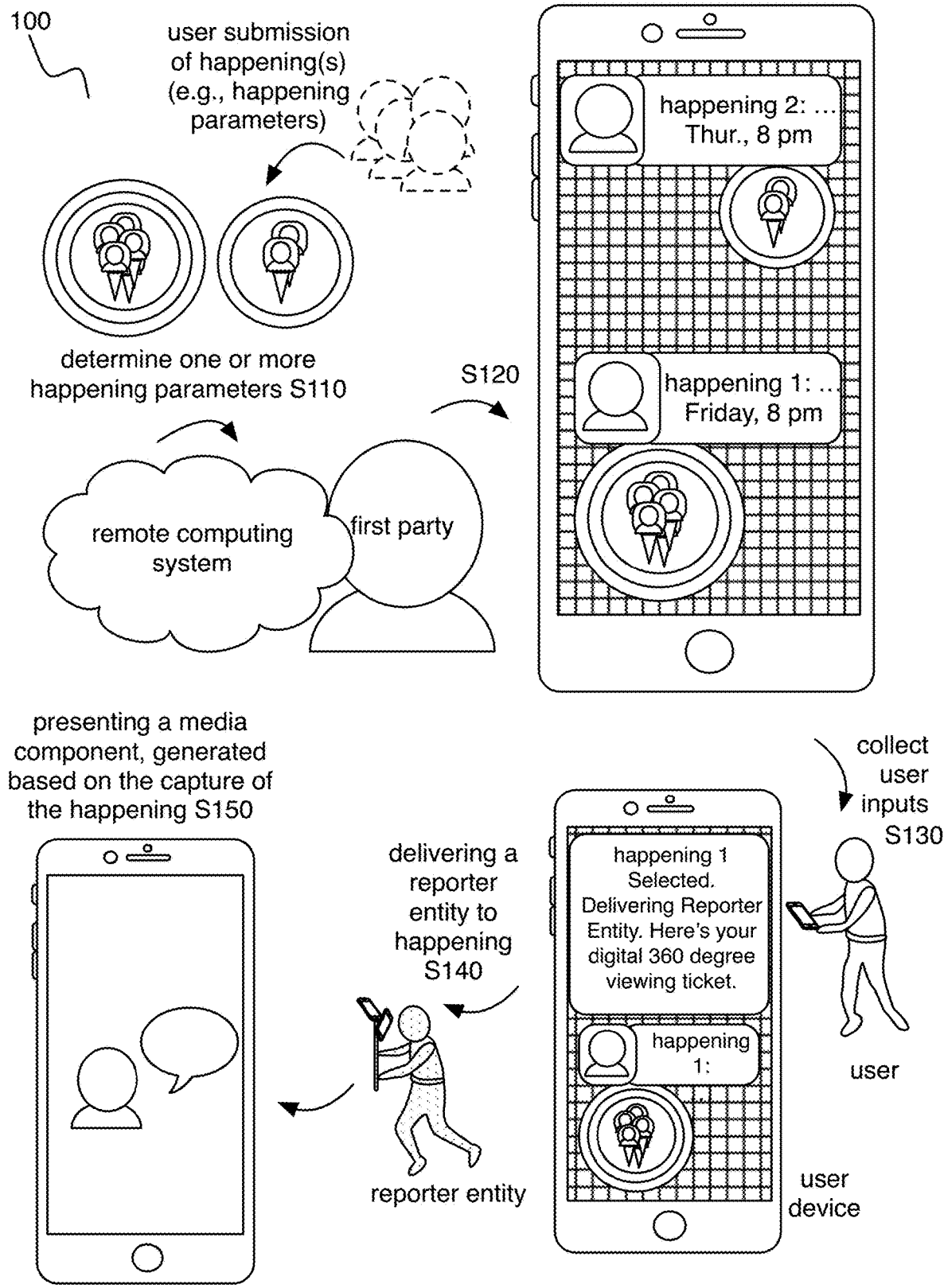
FIG. 2 is a graphical representation of variations of an embodiment of a method for delivering one or more reporter entities.

As shown in FIGS. 1A-1B and 2, embodiments of a method 100 (e.g., for causing reporting of a happening; etc.) can include determining (e.g., at a remote computing system, etc.) a happening parameter S110 (e.g., a happening parameter indicative of a characteristic of the happening; etc.); presenting the happening parameter to a user S120 (e.g., at a mobile application of a user device associated with the user; etc.); receiving (e.g., at the remote computing system, etc.) a user input from the user S130 (e.g., at the user device, wherein the user input is associated with the happening parameter; etc.); delivering, for capture of the happening (e.g., during a time period associated with occurrence of the happening, etc.), a reporter entity to a happening location associated with the happening S140 (e.g., based on the user input, wherein the happening location is remote from a user location of the user; etc.); and/or presenting a media component, generated based on the capture of the happening, to the user S150 (e.g., at the mobile application of the user device; etc.).

As shown in FIGS. 1A-1B and 2, embodiments of a method 100 (e.g., for delivering one or more reporter entities for one or more real-world happenings; etc.) can include: determining one or more real-world happening parameters S110 (e.g., presence of a real-world happening; characteristics of the real-world happening; metadata associated with the real-world happening; etc.) associated with one or more real-world happenings; presenting the one or more real-world happening parameters to one or more users S120 (e.g., at one or more user devices; etc.); collecting one or more user inputs S130 (e.g., a selection of an option to deliver a reporter entity; user inputs associated with the real-world happening parameters; etc.); and/or delivering one or more reporter entities to the one or more real world happenings associated with the one or more real-world happening parameters S140 (e.g., based on the one or more user inputs; etc.).

Additionally or alternatively, the method 100 can include determining and/or delivering one or more reporter entities to one or more virtual happenings (e.g., a virtual happening taking place within a gaming world, within a virtual reality world, etc.), such as in a manner analogous to performing portions of the method 100 for real-world happening parameters and/or real-world happenings (e.g., in relation to reporter happening delivery; etc.); and/or any other suitable processes associated with reporter entities. In a specific example, the happening comprises a virtual event, wherein delivering the reporter entity comprises delivering, for real-life capture (e.g., real-life video screen capture of processes of a computing system; streaming capture of real-life happenings and/or virtual happenings; etc.) of the virtual event, the reporter entity to a virtual happening location associated with the virtual happening based on the user input.

Embodiments of the method 100 and/or the system 200 can function to facilitate determination and/or delivery of reporter entities to real-world happenings, virtual happenings, and/or any suitable types of happenings for enabling a user experience associated with the happening (e.g., viewing of the happening, through a mobile application of a user device, through a virtual reality device, etc.). Happenings can include any one or more of: events (e.g., concerts, sporting events, ticketed events, scheduled events, spontaneous events, culinary happenings, etc.), educational happenings (e.g., seminars, classes, trainings), news happenings, user-generated content, any suitable type of media (e.g., 360 degree view media, virtual reality, augmented reality, video, images, text, graphics, haptic feedback, etc.), live happenings, non-live happenings, happenings associated with real-life locations, happenings associated with virtual locations, happenings associated with real-life and/or virtual entities, and/or any suitable types of happenings. In variations, happenings can be submitted by one or more users, such as through one or more interfaces (e.g., presented through a mobile application) for happening submission.

In a specific example, the method 10o can include identifying the presence of a plurality of real-world happenings (e.g., based on third party happening-related data; etc.), presenting a digital, graphical map including description of the real-world happenings (e.g., graphical representations of the real-world happenings), through a media interface of a mobile application executing on a user device; collecting a user input, at the mobile application, selecting a real-world happening of the plurality, such as in association with a user redemption of redeemable digital tokens; delivering a reporter entity (e.g., a human reporter equipped with camera system; etc.) for capturing the real-world happening in generating a media component; and transmitting the a media component to the user through the mobile application (e.g., for enabling the user to remotely experience the real-world happening; etc.).

Additionally or alternatively, data described herein (e.g., happening parameters such as real-world happening parameters; reporter entity parameters; user inputs; etc.) can be associated with any suitable temporal indicators (e.g., seconds, minutes, hours, days, weeks, etc.) including one or more: temporal indicators indicating when the data was collected, determined, transmitted, received, and/or otherwise processed; temporal indicators providing context to content described by the data, such as temporal indicators indicating a time period of live broadcast by a reporter entity of a real-world happening selected by one or more users; changes in temporal indicators (e.g., data over time; change in data; data patterns; data trends; data extrapolation and/or other prediction; etc.); and/or any other suitable indicators related to time.

Additionally or alternatively, parameters, metrics, inputs, outputs, and/or other suitable data can be associated with value types including: scores (e.g., relevance scores for relevance of an happening to one or more users, which can be used in selecting a subset of real-world happenings to present to a user; scores for ranking happenings, for which delivery of reporter entities can be based, where a subset of happenings can be selected for delivery of the reporter entities; etc.); confidence levels (e.g., associated with feasibility of a reporter entity to record and/or otherwise capture an happening; etc.), values along a spectrum, and/or any other suitable types of values. Any suitable types of data described herein can be used as inputs (e.g., for different models described herein; for portions of the method 100; etc.), generated as outputs (e.g., of models), and/or manipulated in any suitable manner for any suitable components associated with the method 100 and/or system 200.

One or more instances and/or portions of the method 100 and/or processes described herein can be performed asynchronously (e.g., sequentially), concurrently (e.g., in parallel; concurrently on different threads for parallel computing to improve system processing ability for determining real-world happening parameters, for determining data described herein, for facilitating reporter entity delivery; etc.), in temporal relation to a trigger happening (e.g., performance of a portion of the method 100), and/or in any other suitable order at any suitable time and frequency by and/or using one or more instances of the system 200, components, and/or entities described herein.

Embodiments of the system 200 can include a remote computing system (e.g., for processing and/or storage of reporter entity-related data, such as reporter-generated content, reporter entity account data, media components, parameters, other suitable data described herein; for facilitating real-world happening parameter provision and/or delivery of reporter entities; etc.); an application executable on a user device (e.g., a mobile app providing a user interface for accessing media components; for presentation of media interfaces; etc.); an application executable on a reporter entity device (e.g., for communicating with a reporter entity; for facilitating the transport of the reporter entity to an happening; for facilitating transactions with the reporter entity, such as financial transactions; for enabling communication between users and reporter entities, such as in relation to a user communicating directions to a reporter entity for improved capture of an happening; etc.); media interfaces, media components (e.g., reporter-generated content, user-generated content; etc.), optical and/or other suitable recording systems (e.g., for capturing happenings, for generation of media components, etc.); and/or any other suitable components.

The system 200 and/or portions of the system 200 can entirely or partially be executed by, hosted on, communicate with, and/or otherwise include: a remote computing system (e.g., a server, at least one networked computing system, stateless, stateful; etc.), a local computing system, a user and/or reporter entity device (e.g., mobile phone device, other mobile device, personal computing device, tablet, wearable, head-mounted wearable computing device, virtual reality device, augmented reality device, wrist-mounted wearable computing device, etc.), databases (e.g., media component databases, reporter entity databases, user databases, etc.), application programming interfaces (APIs) (e.g., for accessing data described herein, etc.) and/or any suitable component. Communication by and/or between any components of the system can include wireless communication (e.g., WiFi, Bluetooth, radiofrequency, Zigbee, Z-wave, etc.), wired communication, and/or any other suitable types of communication.

The components of the system 100 can be physically and/or logically integrated in any manner (e.g., with any suitable distributions of functionality across the components, such as in relation to portions of the method 100; etc.). In variations, components of the system 200 can be positioned at (e.g., mounted at, integrated with, located proximal, overlaid, positioned within, positioned overlapping, etc.) any suitable location (e.g., in relation to other components of the system 200, etc.). Additionally or alternatively, components of the system 200 can be integrated with any suitable existing components (e.g., existing mobile devices, etc.). However, the method 100 and/or system 200 can be configured in any suitable manner.

2.1 Determining Happening Parameters.

The method 100 can include determining one or more real-world happening parameters associated with one or more real-world happenings, which can function to identify characteristics of real-world happenings and/or other suitable types of happenings for facilitating user selection of and/or delivery of reporter entities to the happenings.

Real-world happening parameters (and/or other suitable happening parameters) can include any one or more of: presence of a real-world happening (e.g., a binary classification describing the existence or non-existence of an happening; a probability of the presence of an happening; confidence levels associated with the presence of an happening; etc.); popularity parameters (e.g., actual number of participants at the happening; expected number of participants at the happening; etc.); participant data (e.g., types of participants at the happening; demographic data for participants; etc.); happening characteristics (e.g., happening location; happening type; happening category; happening performers; performance type; happening cost; etc.); associated media (e.g., media describing the happening; media of historic instances of the happening; media of performers at the happening; etc.); happening metadata; user associations (e.g., historic user participation at related happenings; user interest scores and/or other indicators of user interest in an happening; relevance to a user; etc.); reporter entity associations (e.g., reporter entities historically recorded to have captured related happenings; reporter entities with interest profiles aligning with happening characteristics of the happening; geographic proximity of reporter entities to the happening; other feasibility parameters for a reporter entity to capture the happening; etc.) and/or any other suitable parameters associated with one or more happenings.

In an example, the method 100 can include determining human density parameters (e.g., a heat map of human density in the context of geographical areas, such as based on geographic coordinates and/or a geographic map, etc.) at one or more geographical areas (e.g., within predefined geofences of any suitable size at any suitable position);

comparing the human density parameters to historic human density parameters (e.g., a baseline human density amount generated based off of historic human density data for the geographical area, such as for a historic time period similar to the current time period, etc.); and identifying a presence of an happening based on the comparison (e.g., in response to the human density parameter exceeding the baseline human density parameter by a threshold amount; etc.). In examples, different types of real-world happening parameters can be determined in a sequential manner, such as determining the location, time period, and topic of the happening in response to detecting the presence of the happening (e.g., where detecting the presence of the happening can be performed using different approaches than determining other parameters for the happening; etc.). In a specific example, the happening parameter comprises a human density parameter describing human density proximal the happening, and wherein presenting the happening parameter comprises presenting the human density parameter (e.g., through a human density heat map at a mobile application of the user device; etc.). In a specific example, the method can include in response to determining the human density parameter, determining a location, time period, and topic for the happening; and/or presenting the human density parameter, the location, and the time period simultaneously with presenting the happening parameter, to a user at the mobile application of the user device associated with the user.

In another example, the method 100 can include determining one or more user saving parameters describing a monetary saving, time saving, effort saving, and/or other type of saving describing the difference (e.g., cost difference, etc.) between officially attending the happening (e.g., physically attending the happening) and delivering reporter entity to the happening (e.g., for experiencing the even through a mobile application associated with the reporter entity delivery; etc.), and/or differences between any suitable situations associated with the happening and/or reporter entity delivery (e.g., differences between attending the happening and accessing a feature to view the happening captured by a reporter entity; etc.). In a specific example, the happening parameter comprises a user saving parameter describing a difference between attending the happening and delivering the reporter entity to the happening, wherein the user saving parameter comprises at least one of a monetary saving, a time saving, and a travel distance saving, wherein determining the happening parameter comprises determining the at least one of the monetary saving, the time saving, and the travel distance saving, and/or wherein presenting the happening parameter comprises presenting the at least one of the monetary saving, the time saving, and the travel distance saving to the user at the mobile application of the user device associated with the user. In a specific example, a user saving parameter comprises the monetary saving, wherein determining the user saving parameter comprises determining the monetary saving associated with a monetary cost of the happening, and wherein presenting the happening parameter comprises presenting the monetary saving to the user at the mobile application of the user device associated with the user. In a specific example, the user saving parameter comprises (e.g., in addition to or alterative to the monetary saving and/or other suitable type of user saving parameter; etc.) the travel distance saving, wherein determining the user saving parameter comprises determining the travel distance saving associated with a distance between the happening location and the user location, and wherein presenting the happening parameter comprises simultaneously presenting the monetary saving and the travel distance saving to the user at the mobile application of the user device (and/or at any suitable component and/or user device; etc.) associated with the user. In a specific example, the method can include determining a digital token cost for delivering the reporter entity to the happening location, based on the monetary saving, wherein the user input comprises a digital token redeemable towards the digital token cost, and wherein delivering the reporter entity comprises delivering the reporter entity to the happening location associated with the happening based on the digital token.

In a specific example, the happening parameter comprises a monetary saving and a travel distance saving, and wherein presenting the happening parameter comprises presenting the monetary saving and the travel distance saving to a user at a user device. In a specific example, the monetary saving describes a monetary difference between physically attending the event and viewing the media component, wherein the travel distance saving describes a distance between the happening location and a user location of the user.

Determining happening parameters can be performed with one or more happening parameter models, which can include any one or more of: probabilistic properties, heuristic properties, deterministic properties, and/or any other suitable properties. In examples, determining happening parameters and/or any other suitable portions of the method 100 can apply artificial intelligence approaches (e.g., machine learning approaches, etc.) including any one or more of: supervised learning (e.g., using logistic regression, using back propagation neural networks, using random forests, decision trees, etc.), unsupervised learning (e.g., using an Apriori algorithm, using K-means clustering), semi-supervised learning, a deep learning algorithm (e.g., neural networks, a restricted Boltzmann machine, a deep belief network method, a convolutional neural network method, a recurrent neural network method, stacked autoencoder method, etc.) reinforcement learning (e.g., using a Q-learning algorithm, using temporal difference learning), a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and/or any suitable artificial intelligence approach. In examples, happening parameter models can be trained upon historic reporter entity data (e.g., media components captured by reporter entities; reporter entities responses to surveys about happenings captured by reporter entities, such as in relation to human density at the happening, types of users at the happening, and/or other suitable happening data; etc.), user-generated content, user data (e.g., social media data, such as social media posts about ongoing happenings; user comments associated with happenings, such as user comments to media videos presented through the mobile application; etc.), third party data (e.g., indicating happening characteristics applicable to different types of happenings; etc.), sensor data (e.g., of user devices associated with users geographically proximal happenings; etc.), and/or any other suitable type of data associated with happening parameters.

Additionally or alternatively, determining real-world happening parameters can be performed manually (e.g., by and/or with the assistance of one or more human individuals; etc.), such as through manual collection of real-world happening parameters. In variations, determining happenings can be based on one or more happening parameters submitted by one or more users, such as through one or more interfaces (e.g., presented through a mobile application) for happening submission. In an example, the method can include presenting an interface for happening submission to the user at the mobile application of the user device; and/or receiving a submission through the interface for happening submission from the user, wherein determining the happening parameter comprises determining the happening parameter based on the submission. In a specific example, the method can include presenting an interface for happening submission to a second user at a second user device (e.g., where a first user is presented a media component generated from delivery of a reporter entity to a happening associated with the happening submission; etc.); receiving a first happening submission for the happening through the interface for happening submission from the second user; presenting the interface for happening submission to a third user at a third user device; receiving a second happening submission for the happening through the interface for happening submission from the third user; and/or determining the happening parameter based on the first submission and the second submission (e.g., where multiple submission of the happening parameter can confirm the presence of the happening; where different submissions can include different types of happening parameters; where different submissions can inform additional or alternative characteristics associated with the happening; etc.).

Determining real-world happening parameters is can be performed in real-time (e.g., detection of an happening as the happening is ongoing), prior to an happening (e.g., for enabling presentation of real-world happening parameters about an happening prior to the occurrence of the happening; etc.), after an happening (e.g., for retrospective user viewing of an happening; etc.), in temporal relation to a portion of the method 100 (e.g., determining real-world happening parameters in response to user input requests for reporting of an happening; etc.), and/or at any suitable time and frequency.

However, determining happening parameters can be performed in any suitable manner.

2.2 Presenting Happening Parameters.

The method 100 can include presenting the one or more real-world happening parameters to one or more users at one or more user devices, which can function to inform users of real-world happenings and/or other suitable happenings, for facilitating a reporter entity selection and/or determination process. Happening parameters (e.g., the presence of an happening; descriptions of the happening; etc.) are preferably presented at a mobile user device (e.g., a mobile phone device of the user, etc.), but can additionally or alternatively be presented at any suitable user device and/or other device. Real-world happening parameter notifications to be presented can be of a form (e.g., (e.g., audio, visual, video, images, verbal, virtual reality, augmented reality, touch-related, brightness, opacity, color, font, etc.) corresponding to any suitable format parameters.

Format parameters can include any one or more of: happening-specific parameters (e.g., format parameters specific to presenting and/or otherwise providing happening parameters, such as for providing descriptions of a plurality of happening parameters enabling a user to select the one or more happenings for reporter entity delivery; format parameter for personalization to users, such as formatting to highlight happenings of particular relevance to a user, such as based on historic user behavior associated with historically presented and/or viewed happenings; etc.), graphical parameters (e.g. parameters associated with images, video, virtual reality, augmented reality, etc.), textual parameters (e.g., font size; font color; font type; other font parameters; spacing parameters; etc.); other parameters associated with visually perceptible digital elements (e.g., sizing, highlighting, etc.); audio parameters (e.g., parameters associated with music, sound notifications, a human voice; volume parameters; tone parameters; pitch parameters; etc.); touch parameters (e.g., braille parameters; haptic feedback parameters; etc.); delivery-related parameters (e.g., tailoring of format to device type such as for mobile phone device versus virtual reality device; device communication protocol; etc.) and/or any other suitable format-related parameters. Additionally or alternatively, format parameters can be used in determining user interfaces (e.g., for a mobile application accessed by the user in viewing reporter-generated content; etc.), redemption interfaces (e.g., for determination of reporter entity delivery parameters; etc.), media interfaces, reporter entity interfaces (e.g., for directing the reporter entity to capture an happening; etc.), and/or other suitable data described herein.

Figure 3A:
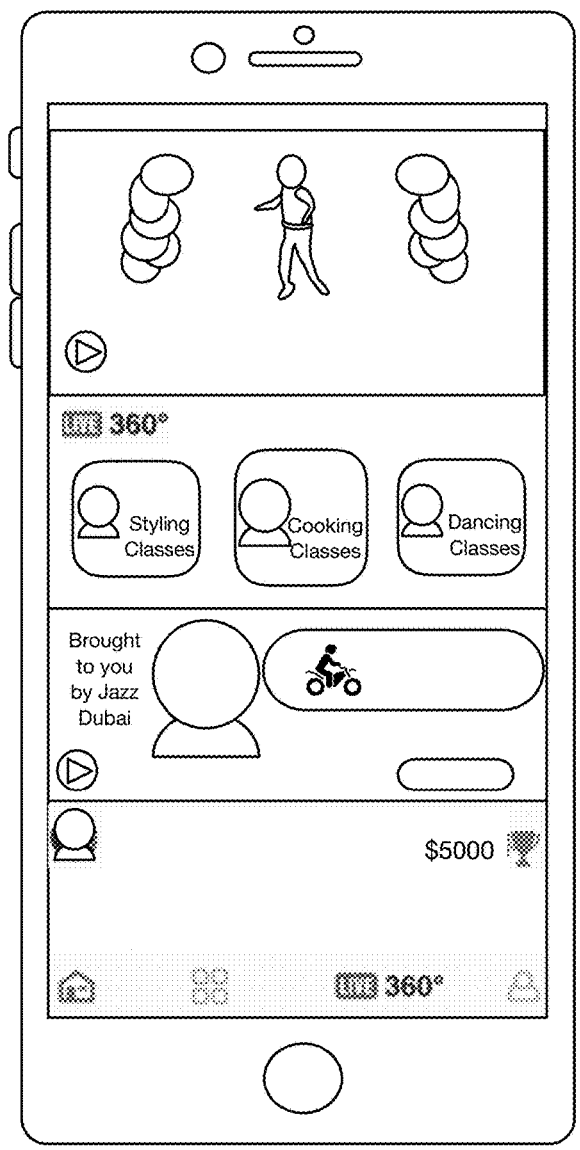
FIG. 3A-3C are example representations of presenting happening parameters in association with reporter entity delivery in a variation of an embodiment of a method.
Figure 3B:
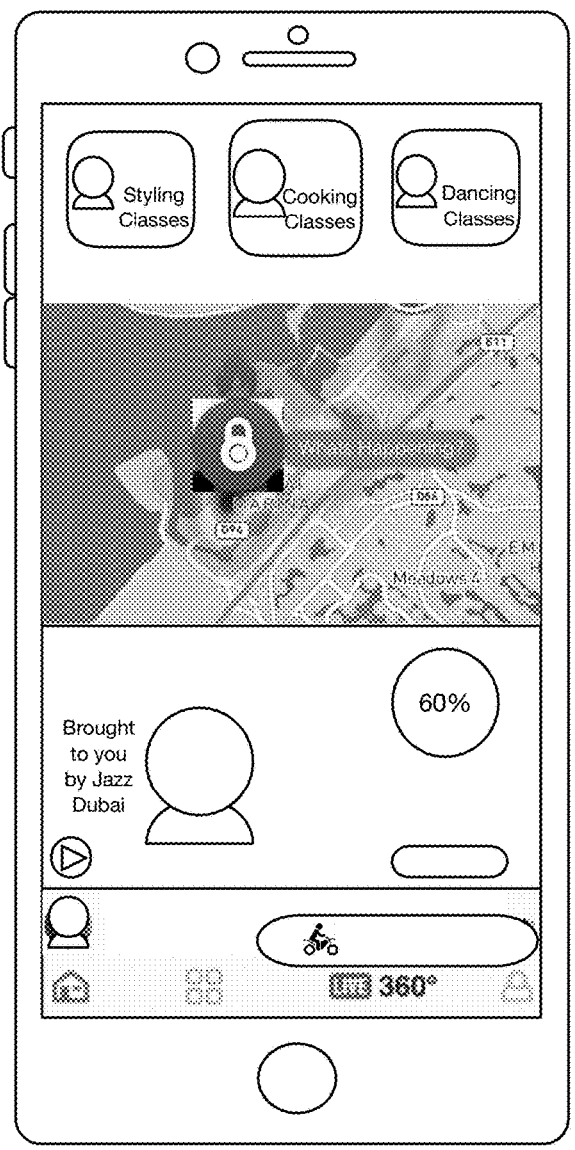
Figure 3C:
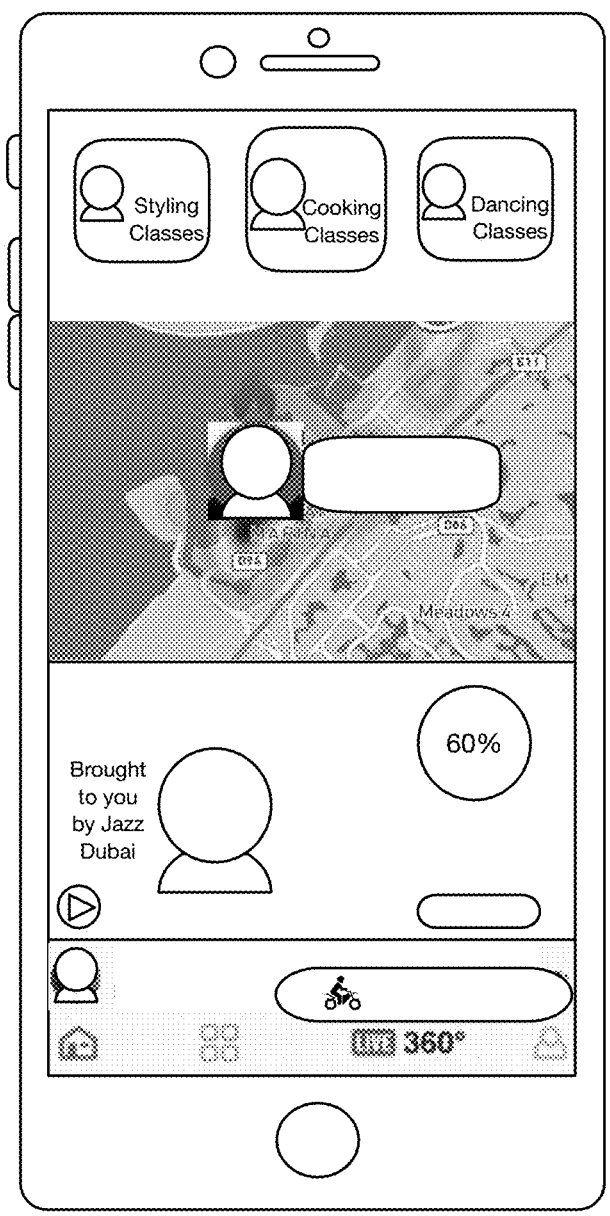
Figure 4A:
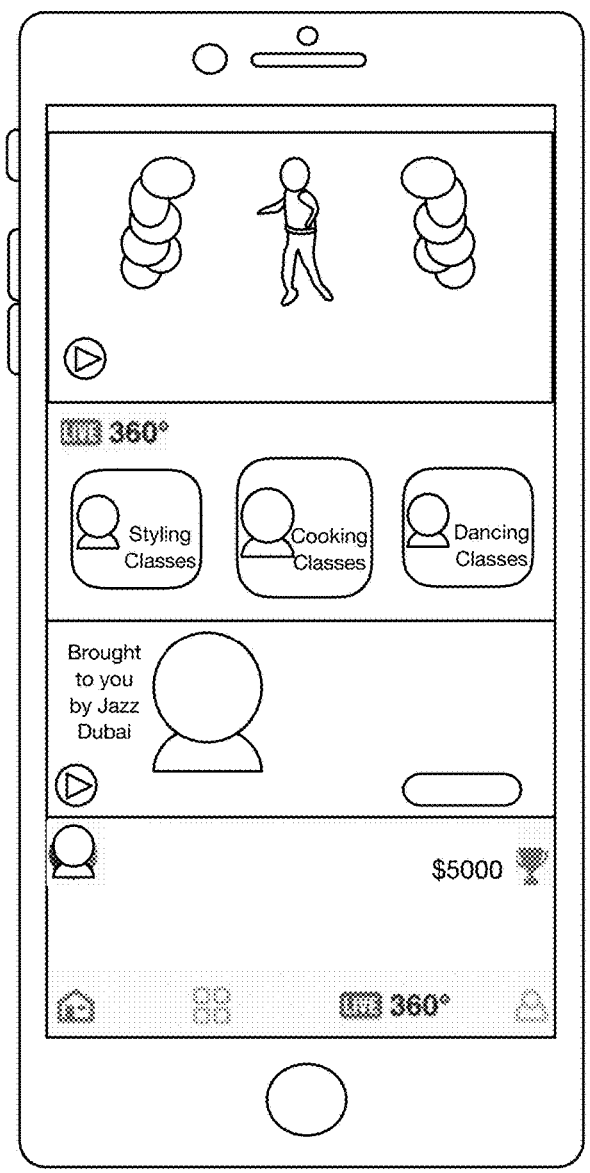
FIG. 4A-4E are example representations example representations of presenting happening parameters such as savings parameters in association with reporter entity delivery in a variation of an embodiment of a method.
Figure 4B:
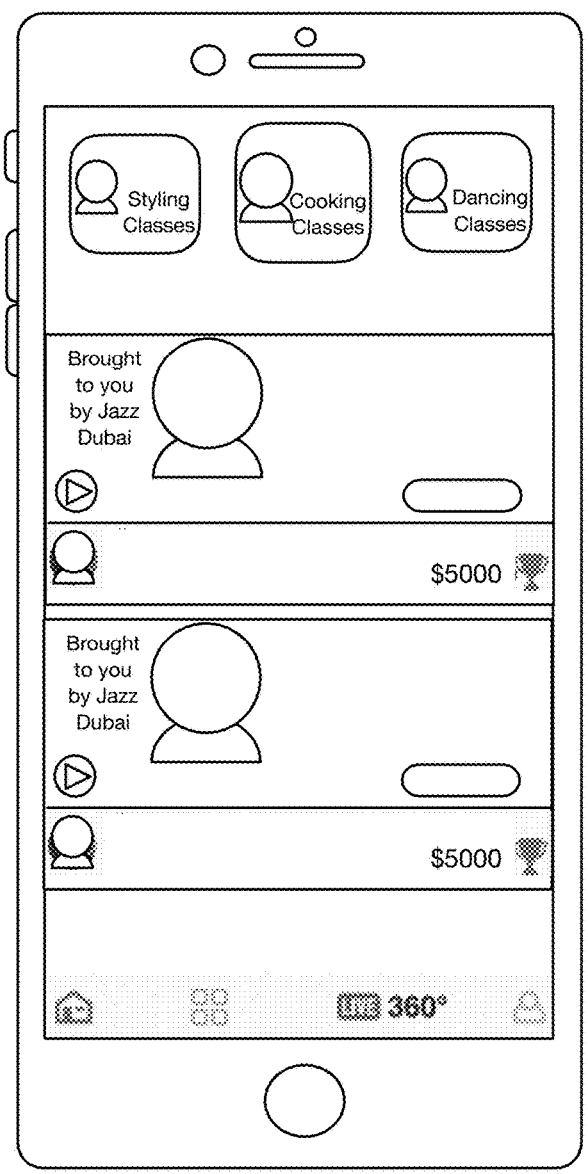
Figure 4C:
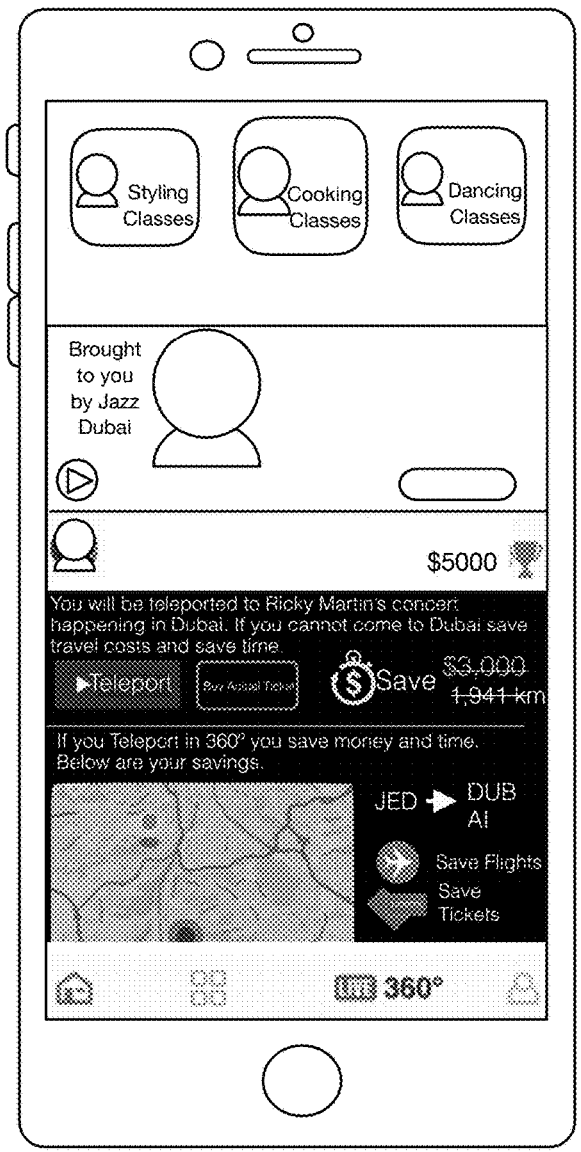
Figure 4D:
Figure 5A:
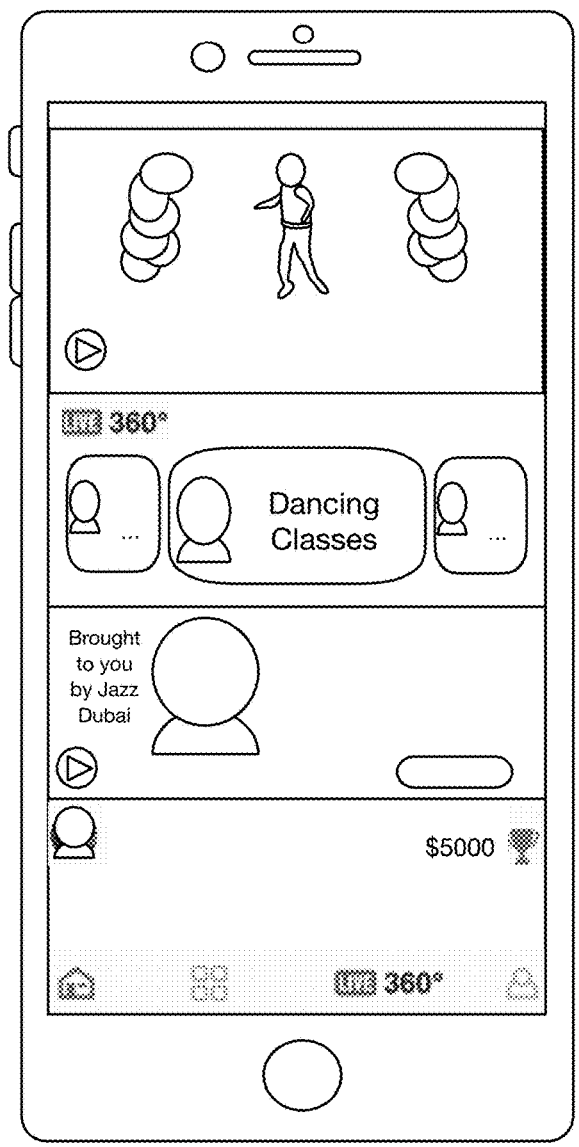
FIG. 5A-5D are example representations of presenting happening parameters in association with reporter entity delivery in a variation of an embodiment of a method.
Figure 5B:
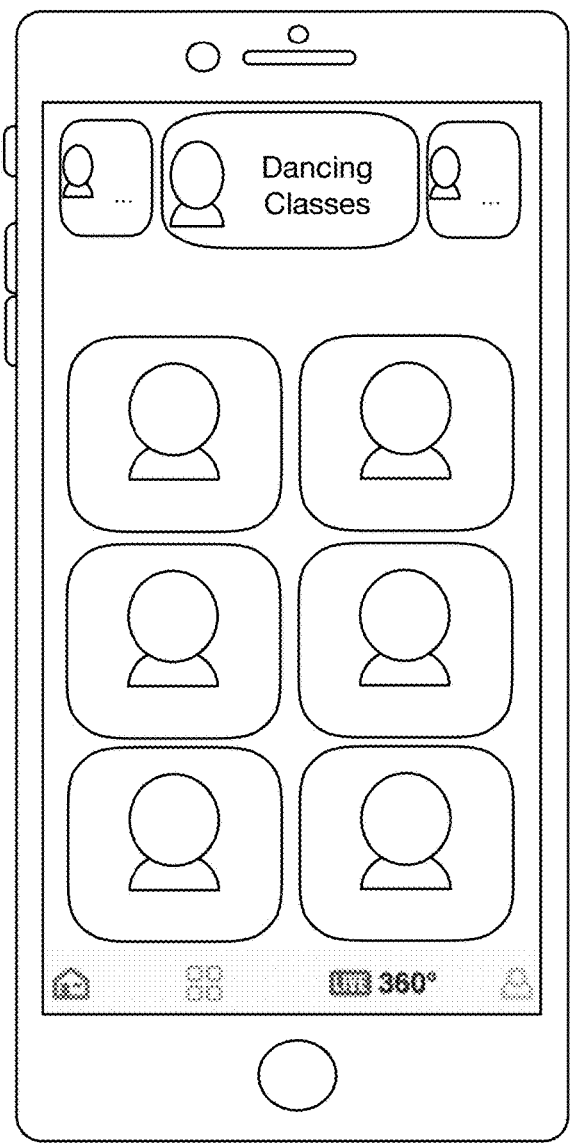
Figure 5C:
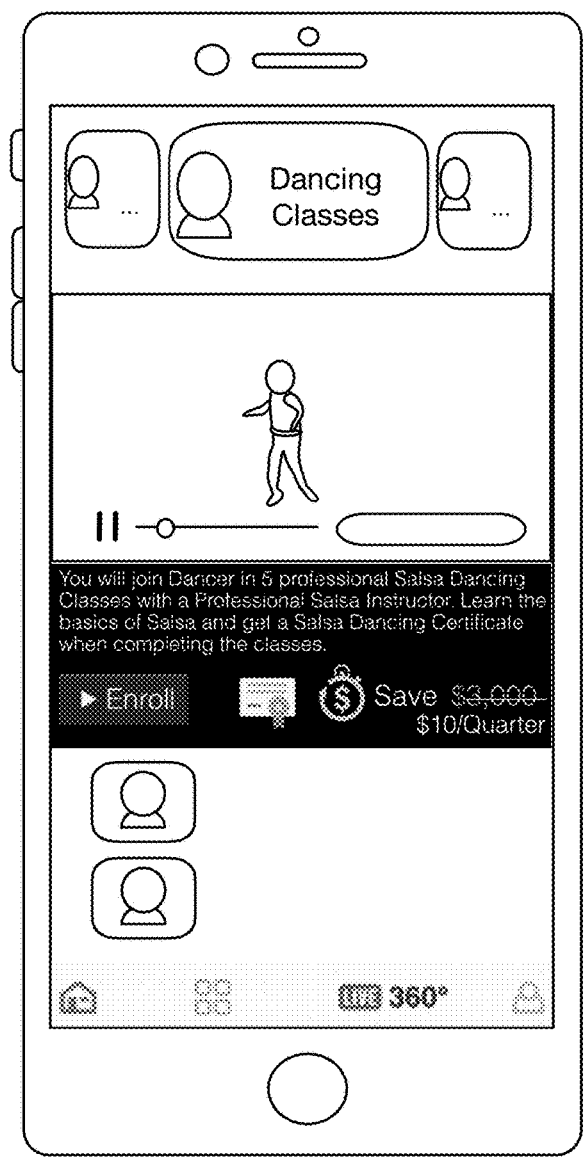
Figure 5D:
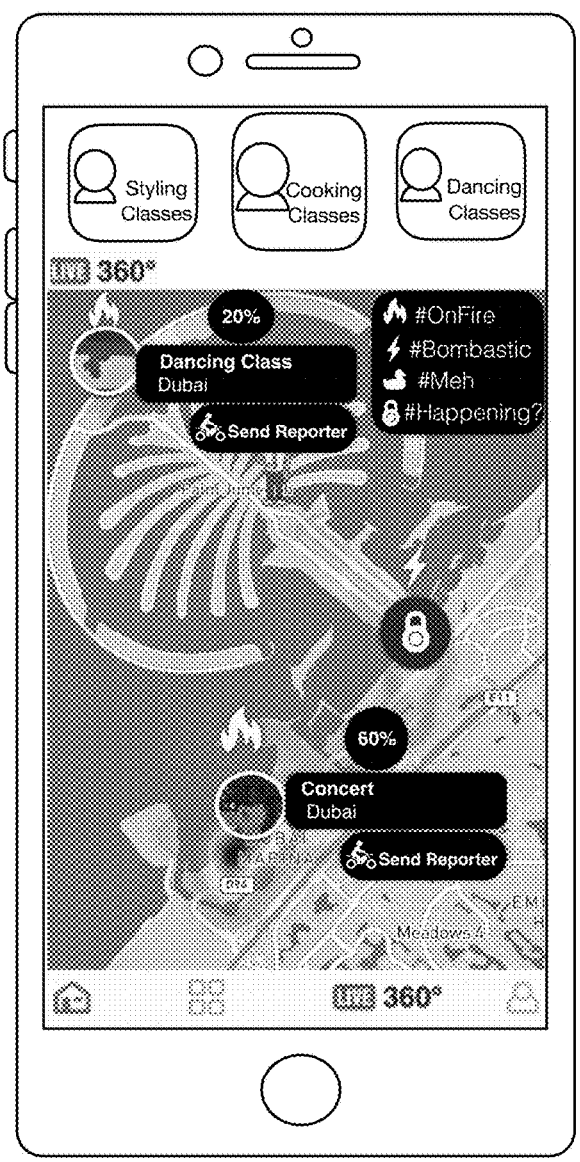

As shown in FIGS. 3B-3C and 5D, in an example, presenting real-world happening parameters can include presenting the happening parameters (e.g., associated media, verbal descriptions, etc.) graphically overlaid a geographical map, where the presented happening parameters corresponding to an happening are positioned at the geographical map at a location corresponding to the happening (e.g., where human density heat maps can be additionally or alternatively presented at the geographical map, such as to indicate the presence and/or popularity of an happening; etc.). In another example, as shown in FIGS. 3A, 4A-4B, and 5A-5B, presenting real-world happening parameters can include presenting happening parameters (e.g., verbal descriptions, associated media, etc.) for a plurality of real-world happenings, to simultaneously provide happening options selectable by one or more users for viewing and/or reporter entity delivery. As shown in FIGS. 4C-4D and 5C, in an example, presenting happening parameters can include presenting saving parameters (e.g., a monetary saving, time saving, effort saving, and/or other type of saving, etc.) indicating an amount saved from experiencing the happening in association with a reporter entity as compared to officially attending (e.g., physically attending, etc.) the happening. In a specific example, the method 100 can include providing one or more users with redeemable digital tokens (and/or other suitable items) based on the saving parameters (e.g., based on the amount saved, etc.), where the redeemable digital tokens can be redeemed for reporter entity delivery and/or other suitable features described herein (e.g., product purchases, etc.).

In variations, presenting the real-world happening parameters can be based on user data (e.g., selecting different happenings and/or happening parameters for presentation based on user data describing user behavior, interests, preferences, etc.), reporter entity data (e.g., selecting different happenings and/or happening parameters for presentation based on reporter entity data describing feasibility of capturing the happening, reporter entity preferences for capturing happenings, etc.), historic real-world happening parameters (e.g., historic popularity of the happening; historic viewership of the type of happening in association with reporter entity delivery; etc.); real-world happening parameter values (e.g., interest scores for the happenings; popularity of the happening; savings parameter values for the happening; etc.); and/or any other suitable data.

Presenting the real-world happening parameters can be in response to determination of the real-world happening parameters, in real-time (e.g., during the happening's occurrence), prior to an happening occurrence, after an happening occurrence, and/or at any suitable time and frequency.

However, presenting real-world happening parameters and/or other suitable happening parameters can be performed in any suitable manner.

2.3 Collecting User Inputs.

The method 100 can include collecting one or more user inputs (e.g., a selection of an option to deliver a reporter entity, etc.) associated with the real-world happening parameters, which can function to initiate and/or otherwise progress a reporter entity delivery process and/or an associated capture and/or presentation of reporter-generated content.

Figure 4E:
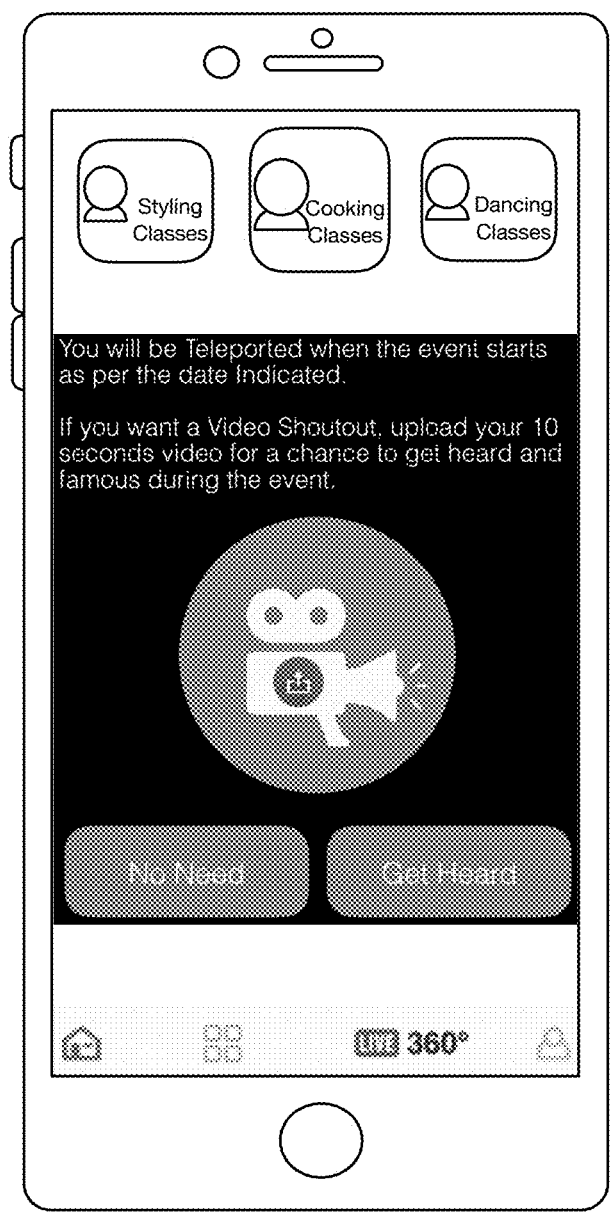

User inputs can include any one or more of: redemption inputs (e.g., redeeming monetary goods, digital redeemable tokens, and/or other suitable items for accessing features associated with the technology, such as for sending a reporter entity to a real-world happening described by one or more of the real-world happening parameters, for purchasing items and/or services associated with reporter-generated content; etc.), user-generated content (e.g., user-generated media components associated with reporter-generated content, such as media components to be presented in coordination with the reporter-generated content; etc.), user communications (e.g., to reporter entities; for guiding and/or otherwise modifying capture by a reporter entity of the happening; communications between users associated with happenings; etc.), touch inputs (e.g., at a touch screen of a user device), audio inputs (e.g., verbal inputs collected at an audio sensor of a user device), optical inputs (e.g., collected at a camera of a user device, etc.), other inputs collectable by sensors, verbal inputs (e.g., typed in at a physical or digital keyboard of a user device, etc.), and/or any other suitable user inputs. In an example, as shown in FIG. 4E, the method 100 can including prompting a user to record user-generated content (e.g., prior to and/or concurrently with presenting reporter-generated content for an happening; etc.), where the user-generated content can be analyzed and/or presented in coordination with presenting the reporter-generated content (e.g., reporter-generated media components capturing the happening; etc.). In a specific example, the method can include in response to presenting the media component (e.g., 360 degree view video of the happening; media component capturing the happening; etc.), receiving, from the user (e.g., through the mobile application of the user device during the time period associated with the occurrence of the happening; etc.), user-generated content (e.g., video, audio, content generated during the time period associated with the occurrence of the happening; etc.) associated with the happening; and/or presenting, during the time period associated with the occurrence of the happening, the user-generated content simultaneously (and/or in any suitable time sequence) with presentation of the media component to an additional user.

In another example, user inputs can trigger portions of the method 100, such as determining real-world happening parameters. For example, the method 100 can include presenting a geographical heat map associated with an happening presence (e.g., human density heat map; social media mention frequency associated with a geographical area; etc.); collecting a user input (e.g., a user finger tap, etc.) at the geographical heat map, where the user inputs corresponds to selection of an happening indicated by the geographical heat map; and determining and/or providing happening parameters (e.g., happening description, happening media, etc.) for the happening in response to collecting the user input.

Collecting user inputs can include collecting one or more user inputs sampled at one or more sensors (e.g., of the user device at which the media interfaces are presented, etc.). Collected sensor data can include any one or more of: motion sensor data (e.g., accelerators, gyroscope, magnetometer; motion sensor data for modifications to a view and/or perspective of the content of reporter-generated content, such as in real-time during a live broadcast of the happening by a reporter entity; etc.), optical sensor data (e.g., camera data, image sensor data, light sensor data, etc.), audio sensor data (e.g., microphone data, etc.), location sensor data (GPS receiver data; beacon data; indoor positioning system data; compass data; etc.), temperature sensor data, weight sensor data, humidity sensor data, biometric sensor data (e.g., heart rate sensor data, fingerprint sensor data, facial recognition data, bio-impedance sensor data, etc.), and/or or any other suitable sensor data.

Sensor data can be used in determining and/or providing happening parameters, reporter entity parameters, in facilitating reporter entity delivery, and/or in performing any other suitable portions of the method 100.

However, collecting one or more user inputs can be performed in any suitable manner.

2.4 Delivering Reporter Entities.

The method 100 can include delivering one or more reporter entities to the one or more real world happenings associated with the one or more real-world happening parameters, based on the one or more user inputs, which can function to facilitate capture of an happening of user interest, for enabling a user to remotely experience (e.g., through viewing of reporter-generated content captured at the happening; etc.) the happening.

Figure 6:
FIG. 6 is an example representation of an reporter entity device in a variation of an embodiment of a system.

The one or more reporter entities can include any one or more of: a human, a device (e.g., a drone with optical sensors for recording, other aircraft, land-based devices and/or vehicles, self-operating vehicles, etc.), and/or any other suitable living or non-living entities. In an example, reporter entities can be equipped with an optical sensor system (e.g., including a plurality of cameras for capturing an happening at different views and/or perspectives and/or for enabling 360 degree viewing of happening, such as shown in FIG. 6). In an example, delivering the reporter entity comprises delivering the reporter entity for capture of a 360 degree view of the happening, wherein presenting the media component comprises presenting the 360 degree view of the happening, and/or wherein the method further comprises facilitating adjustment of the 360 degree view of the happening based on motion sensor data from a motion sensor of the user device. In a specific example, delivering the reporter entity comprises: determining a reporter entity parameter describing feasibility of the capture of the 360 degree view of the happening (e.g., whether a reporter entity proximal the happening possesses optical sensor equipment and/or other suitable equipment to be able to capture media for providing 360 degree view of the happening; etc.); and/or delivering the reporter entity based on the reporter entity parameter (e.g., selecting a particular reporter entity with 360 degree view capture capabilities; providing the reporter entity with 360 degree view capture capabilities; etc.). In a specific example, delivering the reporter entity comprises: determining a reporter entity parameter describing optical sensor equipment accessible by the reporter entity (e.g., if the reporter entity has access to the relevant equipment; etc.); and delivering the reporter entity based on the reporter entity parameter.

In another example, the method 100 can include providing reporter entities with an online platform (and/or offline platform) for one or more of: providing real-world happening parameters; reporter entity preferences and/or other suitable reporter entity parameters described herein; uploading reporter-generated content; communicating with users, a first party, a third party, and/or any other suitable entities; and/or for facilitating any other suitable functionality associated with reporter entities. In a specific example, reporter entities can specify access restrictions (e.g., through the online platform) to viewing the reporter-generated content, where access restrictions can include one or more of a virtual ticket price, an amount of redeemable digital tokens, and/or other forms of transactional items, such as in a digital marketplace for reporter entities and users. Different features associated with the reporter entity platform (e.g., online platform, offline platform) can be one or more of: accessed by all visitors, accessed by verified reporter entities, accessed by a subset of reporter entities (e.g., with high quality scores, such as high ratings provided by users who have accessed the reporter-generated content, etc.), and/or accessible to any selection of individuals.

Delivering reporter entities is preferably based on one or more user inputs. For example, reporter entity delivery can be based on redemptions (e.g., of redeemable digital tokens, etc.) by one or more users (e.g., where reporter entity delivery is initiate in response to the aggregate amount of redemptions exceeding a threshold redemption amount, such as a threshold specified by the corresponding reporter entity and/or by a first party, etc.). In another example, reporter entity delivery can be based on user inputs indicating interest in one or more happenings, where interest scores for the happenings can be calculated based on the user inputs, and where the interest scores can be used to select a subset of happenings to deliver reporter entities to (e.g., selecting the top two happenings every week based on interest score during that week, for reporter entity delivery, but any suitable number of happenings and/or any suitable frequency and/or happening characteristic can be used in association with reporter entity delivery; etc.). In a specific example, the method can include collecting a set of additional user inputs from a set of additional users at a set of additional user devices, wherein delivering the reporter entity to the happening location comprises: determining an interest score based on the user input (e.g., from the user) and the set of additional user inputs; and delivering the reporter entity to the happening location based on the interest score.

Delivering reporter entities can include determining reporter entity parameters, which can be used in describing, informing, guiding, and/or otherwise being associated with reporter entity delivery. Reporter entity parameters can include any one or more of: reporter entity type (e.g., human, robotic device, vehicle, etc.), reporter entity features (e.g., equipped sensor types associated with the reporter entity; mobility features; software associated with the reporter entity; devices associated with the reporter entity, indicating the type of happening capture capable by the reporter entity; etc.), reporter entity preferences (e.g., manually selected preferences; automatically selected preferences; preferences for delivery locations to be sent to; preferences for types of happenings to capture; financial preferences; working condition preferences; preferences associated with temporal indicators, such as working hours; communication preferences; etc.); reporting history (e.g., historical records of happenings captured by a reporter entity; etc.); reporter entity eligibility (e.g., in relation to ability to capture an happening, such as age data, demographic data, reporter entity preferences, location, etc.); reporter entity demographic data (e.g., geographic location, age, mobility, gender, etc.); and/or any other suitable parameters associated with reporter entities.

In variations, determining reporter entity parameters and/or otherwise performing processes associated with delivering reporter entities can be automatically performed, such as by applying reporter entity models employing approaches described herein (e.g., artificial intelligence approaches, etc.).

Additionally or alternatively, determining reporter entity parameters and/or otherwise performing processes associated with delivering reporter entities can be manually performed (e.g., by a human individual, with aid of a human individual, etc.).

Delivering reporter entities can be performed in real-time (e.g., during an happening occurrence; etc.), prior to an happening occurrence (e.g., to capture the entirety of the happening; etc.), after an happening occurrence (e.g., for post-happening coverage; etc.), and/or at any suitable time and frequency.

However, delivering the one or more reporter entities can be performed in any suitable manner. Additionally or alternatively, the method 100 and/or portions of the method 100 can be performed in any suitable manner.

Although omitted for conciseness, the embodiments include every combination and permutation of the various system components and the various method processes, including any variations, examples, and specific examples, where the method processes can be performed in any suitable order, sequentially or concurrently using any suitable system components. Any of the variants described herein (e.g., embodiments, variations, examples, specific examples, illustrations, etc.) and/or any portion of the variants described herein can be additionally or alternatively combined, excluded, and/or otherwise applied.

The system and method and embodiments thereof can be embodied and/or implemented at least in part as a machine configured to receive a computer-readable medium storing computer-readable instructions. The instructions are preferably executed by computer-executable components preferably integrated with the system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the embodiments without departing from the scope defined in the following claims.

I claim:

1. A method for presenting a media representation of a happening, the method comprising:

generating and presenting, through a first user interface screen of a mobile application executing on a user device of a user, a geographical map of a plurality of happenings wherein the plurality of happenings are identified based upon happening-related data provided by one or more third parties through one or more remote computing systems and further presenting first happening parameters corresponding to a first happening of the plurality of happenings and second happening parameters corresponding to a second happening of the plurality of happenings, wherein the first happening parameters and the second happening parameters are respectively graphically overlaid on the geographical map at a first location corresponding to the first happening and a second location corresponding to the second happening and are determined by applying artificial intelligence to data associated with the first happening parameters and the second happening parameters using one or more happening parameter models, and wherein the happening parameter models are trained by historic data associated with the first happening parameters and the second happening parameters;

the presenting happening parameters including presenting a happening parameter of the first happening parameters wherein the happening parameter comprises a human density parameter, the human density parameter being presented through a human density heat map at the geographical map wherein the human density parameter indicates at least one of a presence and a popularity of the first happening;

the presenting the second happening parameters including presenting an indication that the second happening is a live happening and that a 360 degree view of the second happening is available for viewing;

presenting the first location, a time period, and a topic for the first happening simultaneously with presenting the human density parameter through the human density heat map;

presenting, through the user interface of the mobile application, a reporter entity parameter relating to the capture of the first happening by a reporter entity during a time period associated with occurrence of the first happening, at the first location wherein the first location is remote from a user location of the user wherein the reporter entity is equipped with an optical sensor system for capturing views of the first happening for uploading to an online platform and wherein sending of the reporter entity to the first location of the first happening, for the capture of the first happening during the time period associated with the occurrence of the first happening, is initiated, when the reporter entity is not present at the first happening, as part of a reporter entity delivery process in response to at least one of: (1) an aggregate interest in the first happening among users of the mobile application on other devices and (2) an aggregate amount of redemptions relating to the first happening;

wherein the delivery of the reporter entity to the first location of the first happening is further based upon one or more other reporter entity parameters, the one or more other reporter entity parameters including whether the optical sensor system is configured with 360 degree view capture capabilities and preferences for delivery locations for the reporter entity to be sent;

wherein transport of the reporter entity to the first happening through the delivery process is facilitated by a reporter application executing on a device of the reporter entity;

receiving, at the mobile application, an indication of a delivering of the reporter entity to the first happening; and presenting, through a second user interface screen of the mobile application, a representation of the first happening based upon a 360 degree view of the happening captured by a plurality of cameras of the optical sensor system of the reporter entity wherein the representation is provided to the mobile application of the user device by the online platform.

2. The method of claim 1, wherein the optical sensor system is configured to capture media for providing a 360 degree view video of the first happening using the plurality of cameras wherein the 360 degree view video corresponds to the 360 degree view and wherein the reporter entity parameter comprises capture of a 360 degree view video of the first happening, wherein the presenting the representation comprises presenting the 360 degree view video of the first happening captured by the reporter entity, and wherein the method further comprises facilitating adjustment of the 360 degree view video of the first happening based on motion sensor data from a motion sensor of the user device.

3. The method of claim 2, wherein the reporter entity parameter describes one of a probability and a confidence level associated with feasibility of the capture of the 360 degree view of the first happening, the method further including presenting an indication of one of the probability and a confidence level through the user interface of the mobile application.

4. The method of claim 1, further comprising:

presenting an interface for happening submission to the user at the mobile application of the user device; and receiving a submission from the user through the interface for a happening submission corresponding to the first happening wherein one or more of the first happening parameters are determined based at least in part on the submission.

5. The method of claim 1, further comprising:

receiving, from the user through the mobile application of the user device during the time period associated with the occurrence of the first happening, user-generated content associated with the first happening; and presenting, during the time period associated with the occurrence of the first happening, the user-generated content simultaneously with presentation of the representation of the first happening to an additional user.

6. The method of claim 1, wherein at least one happening parameter of the first happening parameters comprises a user saving parameter describing a difference between attending the first happening and delivering the reporter entity to the first happening, wherein the user saving parameter comprises at least one of a monetary saving, a time saving, and a travel distance saving the method further including presenting the at least one happening parameter by presenting the at least one of the monetary saving, the time saving, and the travel distance saving to the user at the mobile application of the user device associated with the user.

7. The method of claim 6, wherein the user saving parameter comprises the monetary saving, wherein the monetary saving is associated with a monetary cost of the happening, and wherein the presenting the at least one happening parameter comprises presenting the monetary saving to the user at the mobile application of the user device associated with the user.

8. The method of claim 7, wherein the user saving parameter further comprises the travel distance saving, wherein the travel distance saving is associated with a distance between the happening location and the user location, and wherein the presenting the at least one happening parameter comprises simultaneously presenting the monetary saving and the travel distance saving to the user at the mobile application of the user device associated with the user.

9. The method of claim 7, wherein the user input comprises a digital token redeemable towards a digital token cost for facilitating the capture of the first happening during the time period associated with occurrence of the first happening.

10. The method of claim 1, wherein the delivery of the reporter entity to the first location of the first happening is further based upon one or more other reporter entity parameters, the one or more other reporter entity parameters including preferences for delivery locations to be sent to, preferences for types of happenings to capture, and preferences associated with temporal indicators.

11. The method of claim 1, wherein the first happening comprises a virtual event and wherein the reporter entity parameter relates to facilitating real-life capture of the virtual event at a virtual happening location associated with the virtual happening.

12. The method of claim 1, wherein the online platform is configured to restrict, based upon access restrictions specified by the reporter entity, access to content related to the first happening generated by the reporter entity wherein the access restrictions include one of a price of a virtual ticket required to access the content and an amount of redeemable digital tokens required to be redeemed to access the content, the method further including:
  presenting, through a user interface of the mobile application, information relating to the access restrictions.

13. A method for presenting a media representation of a happening, the method comprising:
  presenting, through a first user interface screen of a mobile application executing on a first user device of a first user, a geographical map of a plurality of happenings at a plurality of locations and further presenting happening parameters corresponding to at least one happening of the plurality of happenings, and additional happening parameters corresponding to other happenings of the plurality of happenings, wherein the happening parameters are graphically overlaid on the geographical map at a location corresponding to the happening and are determined by applying artificial intelligence to data associated with the happening parameters using one or more happening parameter models and wherein the happening parameter models are trained by historic data associated with the happening parameters;
  the presenting happening parameters including presenting a human density parameter through a human density heat map at the geographical map so as to indicate at least one of a presence and a popularity of the happening;
  the presenting the second happening parameters including presenting an indication that one of the other happenings is a live happening and that a 360 degree view of the one of the other happenings is available for viewing;
  presenting, through a user interface of the mobile application, a reporter entity parameter relating to the capture of the happening by a reporter entity during a time period associated with occurrence of the happening
  wherein the reporter entity is equipped with an optical sensor system for capturing views of the happening for uploading to an online platform and wherein sending of the reporter entity to the location corresponding to the happening, for the capture of the happening during the time period associated with the occurrence of the happening, is initiated, when the reporter entity is not present at the first happening, as part of a reporter entity delivery process in response to at least one of: (1) an aggregate interest in the happening among users of the mobile application and (2) an aggregate amount of redemptions relating to the happening;
  wherein the delivery of the reporter entity to the location of the happening is further based upon one or more other reporter entity parameters, the one or more other reporter entity parameters including whether the optical sensor system is configured with 360 degree view capture capabilities and preferences for delivery locations for the reporter entity to be sent;
  wherein transport of the reporter entity to the happening through the delivery process is facilitated by a reporter application executing on a device of the reporter entity;
  presenting a location, a time period, and a topic for the happening simultaneously with presenting the human density parameter through the human density heat map;
  presenting, through the user interface of the mobile application, an indication that a reporter entity is being delivered to the first location of the happening; and
  presenting, through a second user interface screen of the mobile application, a representation of the happening based upon a 360 degree view of the happening captured by a plurality of cameras of the optical sensor system of the reporter entity wherein the representation is provided to the mobile application of the user device by the online platform.

14. The method of claim 13, wherein the delivery of the reporter entity to the location corresponding to the happening is further based upon one or more other reporter entity parameters, the one or more other reporter entity parameters including preferences for delivery locations to be sent to, preferences for types of happenings to capture, and preferences associated with temporal indicators.

15. The method of claim 13, further comprising:
  receiving, from the first user through the user device, user-generated content associated with the happening; and
  presenting the user-generated content simultaneously with presentation of the representation of the happening to an additional user.

16. The method of claim 13, wherein the optical sensor system is configured to capture media for providing a 360 degree view video of the happening using the plurality of cameras wherein the 360 degree view video corresponds to the 360 degree view and wherein the reporter entity parameter comprises capture of a 360 degree view video of the happening, wherein the presenting the representation comprises presenting the 360 degree view video of the happening captured by the reporter entity, and wherein the method further comprises facilitating adjustment of the 360 degree view video of the first happening based on motion sensor data from a motion sensor of the user device.

17. The method of claim 16, wherein the reporter entity parameter describes optical sensor equipment of the optical sensor system.

18. The method of claim 13, wherein the happening parameter comprises a monetary saving and a travel distance saving, and wherein presenting the happening parameter comprises presenting the monetary saving and the travel distance saving to the first user at the first user device.

19. The method of claim 18, wherein the monetary saving describes a monetary difference between physically attending the event and viewing the media component, wherein the travel distance saving describes a distance between the happening location and a user location of the user.

20. The method of claim 13, wherein the reporter entity parameter describes one of a probability and a confidence level associated with feasibility of the capture of the 360 degree view of the happening, the method further including presenting an indication of one of the probability and a confidence level through the user interface of the mobile application.

21. A method for presenting a medial representation of a happening, the method comprising:
generating and presenting, through a first user interface screen of a mobile application executing on a user device of a user, a geographical map of a plurality of happenings wherein the plurality of happenings are identified based upon happening-related data provided by one or more third parties through one or more remote computing systems and further presenting first happening parameters corresponding to a first happening of the plurality of happenings and second happening parameters corresponding to a second happening of the plurality of happenings, wherein the first happening parameters and the second happening parameters are respectively graphically overlaid on the geographical map at a first location corresponding to the first happening and a second location corresponding to the second happening;
the presenting the second happening parameters including presenting an indication that the second happening is a live happening and that a 360 degree view of the second happening is available for viewing;
presenting the first location, a time period, and a topic for the first happening;
presenting, through the user interface of the mobile application, a reporter entity parameter relating to the capture of the first happening by a reporter entity during a time period associated with occurrence of the first happening, at the first location wherein the first location is remote from a user location of the user-wherein the reporter entity is equipped with an optical sensor system having a plurality of cameras for capturing 360 degree view video of the first happening for uploading to an online platform and wherein delivery of the reporter entity to the first location of the first happening, for the capture of the first happening during the time period associated with the occurrence of the first happening, as part of a reporter entity delivery process is initiated, when the reporter entity is not present at the first happening, in response to an aggregate interest in the first happening among users of the mobile application on other devices, the reporter entity being selected for delivery based upon at least in part upon: the optical sensor system being configured with 360 degree view capture capabilities, and preferences for delivery locations for the reporter entity to be sent;
wherein transport of the reporter entity to the first happening through the delivery process is facilitated by a reporter application executing on a reporter entity device; and
presenting, through a second user interface screen of the mobile application, a representation of the first happening based upon the 360 degree view video of the happening captured by the plurality of cameras of the optical sensor system of the reporter entity wherein the representation is provided to the mobile application of the user device by the online platform, the presenting the representation including facilitating adjustment of the 360 degree view video of the first happening based on motion sensor data from a motion sensor of the user device.

22. The method of claim 21, wherein the reporter entity is selected for delivery also based upon one or more of: software associated with the reporter entity, historical records of happenings captured by the reporter entity, financial preferences of the reporter entity, working condition preferences of the reporter entity including working hours.

* * * * *